United States Patent [19]

Moore

[11] 4,447,876
[45] May 8, 1984

[54] EMULATOR CONTROL SEQUENCER

[75] Inventor: Wayne A. Moore, Portland, Oreg.

[73] Assignee: Tektronix, Inc., Beaverton, Oreg.

[21] Appl. No.: 288,255

[22] Filed: Jul. 30, 1981

[51] Int. Cl.³ .......................... G06F 9/44; G06F 5/00
[52] U.S. Cl. ................................................ 364/200
[58] Field of Search ... 364/200 MS File, 900 MS File

[56] References Cited
U.S. PATENT DOCUMENTS 4,050,058 9/1977 Garlic ................................. 364/200
4,210,960 7/1980 Borgerson et al. ................. 364/200
4,249,248 2/1981 Yomogida et al. ................. 364/900

Primary Examiner—Harvey E. Springborn
Attorney, Agent, or Firm—George T. Noe

[57] ABSTRACT

An emulator control sequencer comprises a programmable state machine which passively monitors the data bus of an emulator microprocessor, extracts certain information indicative of internal processor behavior, such as when the next opcode fetch will occur, as well as detecting current opcodes, and generates control signals for the emulator.

9 Claims, 3 Drawing Figures

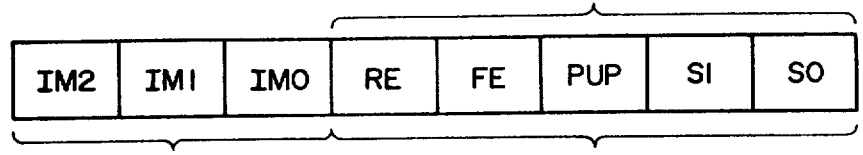

IMMEDIATE OUTPUTS TO DECODER 22
001 = INHIBIT
010 = TRAP ILLEGAL DATA BYTE
011 = USER DATA CYCLE
100 = RELATCH INSTRUCTION TYPE REGISTER
101 = S/W INTERRUPT
110 = FLOAT ADDRESS BUS

NEXT-CYCLE CONTROL INPUTS FOR ADDRESS GENERATOR 20 (Am 2911 SEQUENCER)

Fig. 2A.

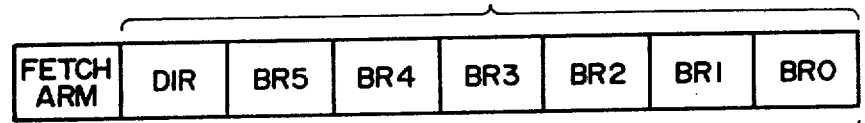

6-BIT ABSOLUTE BRANCH ADDRESS

DIRECTION CONTROL FOR BRANCH ADDRESS MUX 24
0 = DATA-BUS DECODER 12
1 = PIPELINE REGISTER 18

TO CONTROL INPUTS OF DECODER 22
1 = ENABLE FETCH ON NEXT CYCLE

Fig. 2B.

EMULATOR CONTROL SEQUENCER

BACKGROUND OF THE INVENTION

Systems used in the design and development of microprocessor-based products typically include so-called emulators, or emulation subsystems, which emulate the target microprocessor to be used in the product prototype. Emulators permit hardware and software to be developed concurrently for the prototype, and with great flexibility, allowing design changes to be made and debugging to be carried out before the designs are implemented permanently. The emulator comprises an emulator processor and an emulator controller, both components of which are on the system bus and operate in conjunction with the system processor.

It would be desirable for the emulator controller to passively monitor the emulator data bus and extract certain information predictive of emulator processor behavior from an instruction stream on the data bus, and to operate in a predetermined sequence to generate control signals in response to the information extracted. It would further be desirable for such a control device, hereinafter referred to as an emulator control sequencer, to be universal so as to accommodate a number of different emulator processors.

SUMMARY OF THE INVENTION

In accordance with the present invention, a universal emulator control sequencer maintains synchronization with the fetch-execute cycle of an emulator microprocessor through passive monitoring of the emulator data bus and specific status lines, and generates signals which predict operation-code (opcode) fetches, inhibit certain bus cycles which contain irrelevant information, detect fetches of invalid opcodes, and provide miscellaneous control and status signals for the emulator.

In the preferred embodiment of the present invention, an instruction decoder decodes each byte of instruction on the emulator data bus into instruction types, for opcode fetches, and branch addresses for use by an address generator. The instruction types are latched and used as "page" addresses for a microinstruction memory. The microinstruction memory, a pipeline register, and the aforementioned address generator form a state machine that executes the set of instructions stored in the microinstruction memory. Addresses to be output by the address generator may be selected from several sources, including the microinstruction memory, depending on certain applied control data furnished via the pipeline register from the microinstruction memory. The output of the microinstruction memory is decoded to produce the above-mentioned control signals. In this embodiment, the instruction decoder and microinstruction memory are random-access memories (RAM's), and as such are fully programmable. Therefore, not only may specific processor behavior be predicted in accordance with programmed instructions, but the emulator control sequencer of the present invention universally may be applied to a number of different emulator microprocessors.

It is therefore an object of the present invention to provide an emulator control sequencer capable of extracting and acting upon certain information predictive of emulator processor behavior from an instruction stream on the emulator data bus.

It is another object of the present invention to provide an emulator control sequencer which while passively monitoring a data bus maintains synchronization with the fetch-execute cycle of an emulator microprocessor and generates signals which indicate certain internal processor behavior.

It is an additional object of the present invention to provide an emulator control sequencer which is a programmable state machine.

It is a further object of the present invention to provide an emulator control sequencer which is capable of predicting when the next opcode fetch will occur by decoding other information in an instruction stream as well as the current opcode.

Other objects and advantages of the present invention will become apparent to those having ordinary skill in the art upon a reading of the following description when taken in conjunction with the drawings.

DRAWINGS

FIG. 2A depicts the microinstruction word format for control outputs and address generator control; and FIG. 2B depicts the microinstruction word format for fetch and branch control.

DETAILED DESCRIPTION OF THE INVENTION

Figure 1:
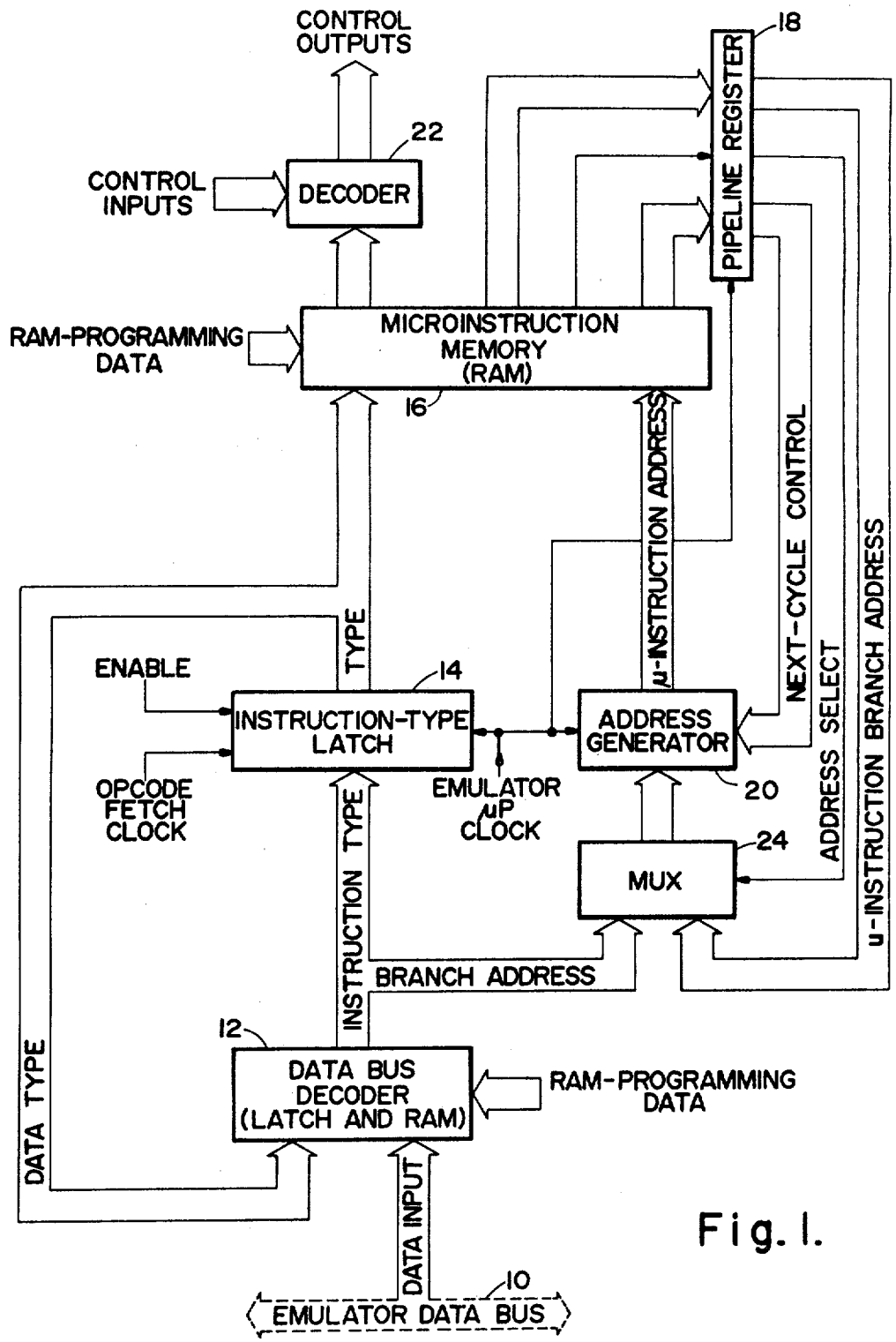
FIG. 1 is a block diagram of an emulator control sequencer in accordance with the present invention.

Referring now to the block diagram of FIG. 1, an emulator data bus 10, represented by dashed lines, provides data inputs to a data bus decoder 12. Actually, the data bus 10 interconnects a system microprocessor (not shown) and an emulator processor (not shown) of a microprocessor development lab system, and the decoder 12 passively monitors the instruction stream passing over the bus. A latch may be inserted between the data bus 10 and the input of decoder 12 to hold the input data for a full clock cycle. The data bus decoder 12 may suitably be a random-access memory (RAM) capable of being programmed by the system microprocessor. In the preferred embodiment of the present invention, decoder 12 comprises four commercially-available Intel 2148 4-K static RAM's, organized in combination as 2048 words by 8 bits, to decode one byte (8-bits) of data into 4-bit instruction types for opcode fetches, and/or 4-bit or 6-bit branch addresses for use by an address generator. An instruction-type latch 14, which may suitably be a 74S173 4-bit D-type register, accepts as inputs the 4-bit instruction-type from the data-bus decoder 12. When enabled, latch 14 is clocked by the sequencer clock, which suitably may be the emulator microprocessor clock, delayed slightly to compensate for propagation delays in the data path. Actually, latch 14 is clocked only following opcode fetches or when a certain output from the output decoder 22 is active. Also, latch 14 is cleared upon receipt of an opcode fetch clock. The outputs of latch 14, indicating the presence of a current opcode, are used as "page" addresses for a microinstruction memory 16, and are also fed back to be used as inputs to the data-bus decoder 12. In this manner, the occurrence of the next opcode fetch may be predicted by decoding other information on the data bus 10 for use by the emulator control sequencer.

Microinstruction memory 16, a pipeline register 18, and an address generator 20 form a state machine that executes a set of instructions stored in a microinstruction memory. Microinstruction memory 16 comprises four Intel 2148 4-K static RAM's organized as 1024 words by 16 bits, and is programmed by the system microprocessor. Certain outputs of the microinstruction memory 16 are decoded by a decoder 22 to provide desired control outputs, such as fetch, cycle inhibit, etc. Certain other outputs are stored in the pipeline register 18 to provide next-cycle control for the address generator 20, microinstruction branch addresses which are applied via a multiplexer (MUX) 24 to address generator 20, and an address select signal for the MUX 24. The MUX 24 may also select branch addresses from the data-bus decoder 12. In the embodiment built and tested, MUX 24 comprises a pair of 74S157 quad 2-input multiplexers. The pipeline register 18 comprises a pair of 74S174 hex D flip-flops in which information on the D inputs is transferred to storage on a positive-going clock edge. Both the pipeline register 18 and the address generator 20 are clocked by the sequencer clock, or microprocessor clock, which clocks the instruction-type latch 14 as mentioned previously. FIGS. 2A and 2B show the word format for the outputs of the microinstruction memory 16.

The address generator 20 comprises two commercially-available Am 2911 microprogram sequencers cascaded together to provide expanded input (8 bits) and output capabilities. These particular devices each include an internal address register, a 4-word by 4-bit memory stack with stack pointer and push-pop control for nesting subroutines, a cascadable 4-bit microprogram counter, and internal control circuits such as a multiplexer for address source selection and an incrementer. Based on the control data from the pipeline register 18 and the address inputs from multiplexer 24, the address generator 20 generates sets of addresses for the microinstruction memory 16.

The decoder 22 may suitably be a commercially-available 74S138 1-of-8 decoder/demultiplexer. All of the outputs are mutually exclusive, and therefore a variety of control functions may be effected. The control inputs to the decoder 22 may come from various status lines of the emulator microprocess or, such as valid-memory-address, read-write, executing, interrupt detection, and various fetch functions. This allows the decoder 22 to be enabled or disabled in accordance with the status of the emulator microprocessor.

The emulator control sequencer may thus be constructed entirely of commercially-available components. Those mentioned hereinabove provide compatibility with 6800-style microprocessors. It should be pointed out that all memory in the emulator control sequencer is RAM-based and is accessible as system memory by the system processor.

As understood from the above description, an emulator control sequencer passively monitors the data bus of an emulator microprocessor and extracts certain information predictive of processor behavior from an instruction stream on the data bus. Information which is desired to be extracted by the emulator control sequencer is programmed into random-access memories within the sequencer by the system microprocessor. Therefore, the emulator control sequencer is universal and it may accommodate a number of different processors, with each one providing the necessary programming to carry out the desired signal-generating functions.

While I have shown and described herein the preferred embodiment of my invention, it will be apparent to those skilled in the art that many changes and modifications may be made without departing from my invention in its broader aspects. Therefore, the scope of the present invention should be determined only by the following claims.

What I claim as my invention is:

1. An emulator control sequencer for monitoring an emulator processor data bus, decoding instructions predictive of emulator processor behavior passing thereover from a system processor to said emulator processor, and generating control signals for said emulator processor, comprising:
   first decoding means for decoding bytes of instruction data occuring on said data bus to provide instruction-type data words;
   a state machine comprising storage means containing a set of instructions in addressable storage locations therein and being responsive to said instruction-type data words to execute said instructions and produce a plurality of control data thereby, and address generator means responsive to at least a portion of said plurality of control data for addressing storage locations of said storage means in a predetermined sequence determinable by said instruction-type data words, said state machine receiving an emulator processor clock signal and operating in synchromism therewith; and
   second decoding means for decoding at least a portion of said plurality of control data thereby to produce said control signals in response to emulator processor status signals.

2. An emulator control sequencer in accordance with claim 1 wherein said first decoding means comprises a first random-access memory containing predetermined instruction-type data words at addressable storage locations therein, said random-access memory being addressed by said bytes of instruction data occuring on said data bus.

3. An emulator control sequencer in accordance with claim 2 wherein said first decoding means further comprises a latch for receiving and storing said instruction-type data words from said random-access memory upon receipt of a predetermined clock signal.

4. An emulator control sequencer in accordance with claim 3 wherein said instruction-type data words are coupled from said latch to address additional addressable storage locations of said first random-access memory thereby to provide further decoded instruction-type data words.

5. An emulator control sequencer in accordance with claim 3 wherein said first random-access memory is programmable.

6. An emulator control sequencer in accordance with claim 2 wherein said first random-access memory also contains predetermined branch addresses stored therein so that said first decoding means also produces branch addresses to be applied to said address generator means.

7. An emulator control sequencer in accordance with claim 2 wherein said storage means of said state machine comprises a second random-access memory, said second random-access memory being programmable.

8. An emulator control sequencer in accordance with claim 1 wherein said state machine further comprises register means coupled between the output of said storage means and the input of said address generator means, said register means and said address generator means being operable in synchronism with said clock signal.

9. An emulator control sequencer in accordance with claim 1 wherein said first decoding means also produces branch addresses and said storage means of said state machine also produces branch addresses, and said address generator means is further selectively responsive to branch addresses from one of said first decoding means and said storage means.

* * * * *